United States Patent [19]

Vataru

[11] 4,052,974
[45] Oct. 11, 1977

[54] TUBELESS SOLAR COLLECTOR

[75] Inventor: Marcel Vataru, Los Angeles, Calif.

[73] Assignee: Philip M. Hinderstein, Orange, Calif. ; a part interest

[21] Appl. No.: 707,202

[22] Filed: July 21, 1976

[51] Int. Cl.² .............................................. F24J 3/02
[52] U.S. Cl. ................................... 126/270; 126/271; 165/170
[58] Field of Search ............... 126/270, 271; 237/1 A; 165/168, 170

[56] References Cited

U.S. PATENT DOCUMENTS

| | | | |
|---|---|---|---|
| 2,595,472 | 5/1952 | Larkin | 165/170 |
| 3,513,828 | 5/1970 | Masters | 126/271 |
| 3,985,116 | 10/1976 | Kapany | 126/270 |
| 3,986,491 | 10/1976 | O'Hanlon | 126/271 |

Primary Examiner—John J. Camby
Assistant Examiner—Henry C. Yuen
Attorney, Agent, or Firm—Philip M. Hinderstein

[57] ABSTRACT

An inexpensive, highly efficient, durable, and easy to manufacture solar collector of the flat-plate type. The collector includes a heat exchanger having an upper plate, a lower plate, and four triangularly-shaped side plates defining an enclosed chamber, all plates being highly absorbent of solar radiation, the upper plate curving inwardly so that a central portion thereof extends closely adjacent the lower plate along a hot line extending between opposite corners of the collector; and means for conducting a fluid into and out of the chamber, at the remaining corners thereof, on opposed sides of the hot line, so that the fluid flows through the chamber, perpendicular to and in a thin sheet past the hot line, absorbing heat from the upper plate. The collector also includes a frame in which the heat exchanger is supported along the outer edges only in a manner such that light is reflected to the lower plate to increase the efficiency of heat absorption.

20 Claims, 11 Drawing Figures

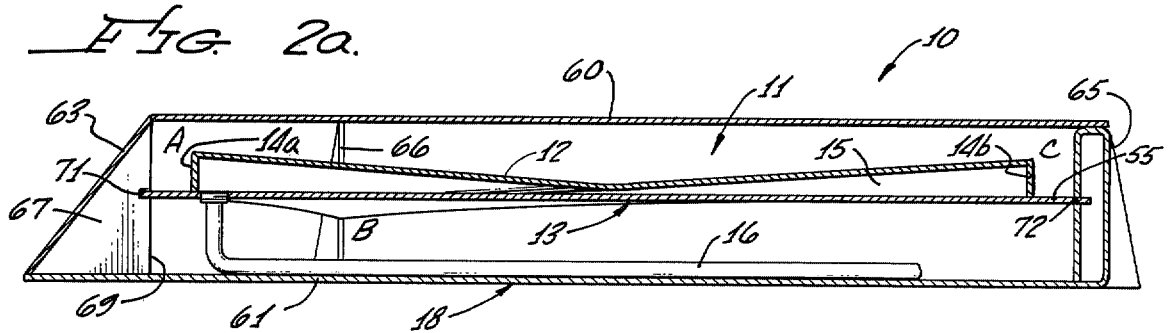
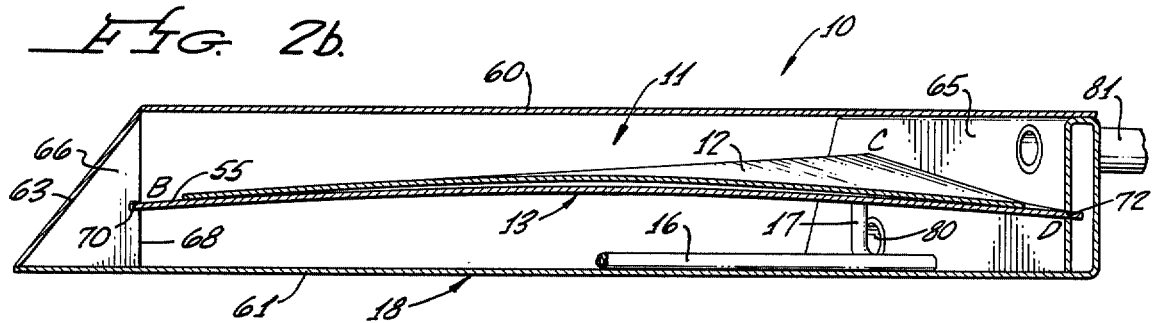
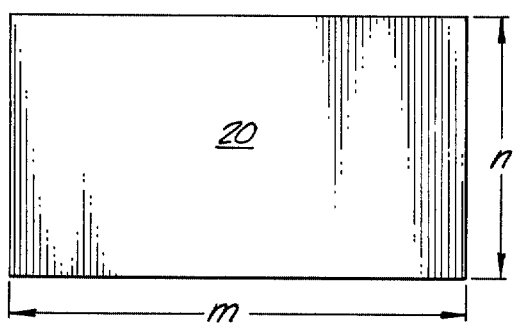
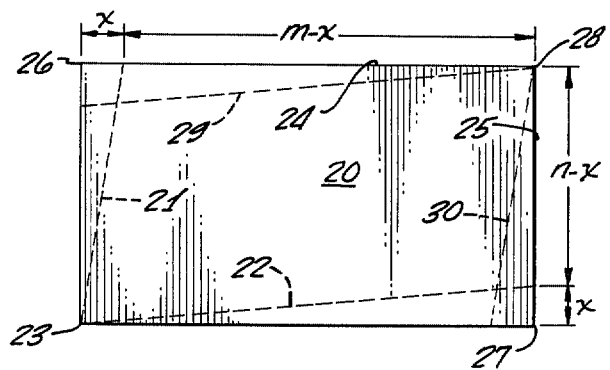
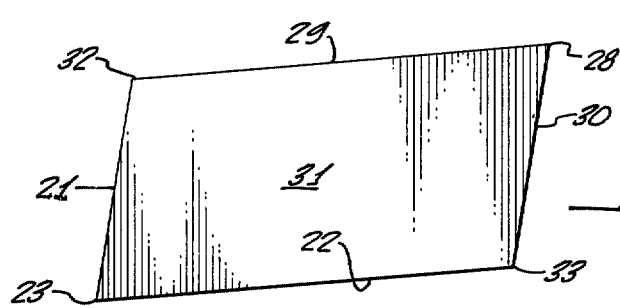

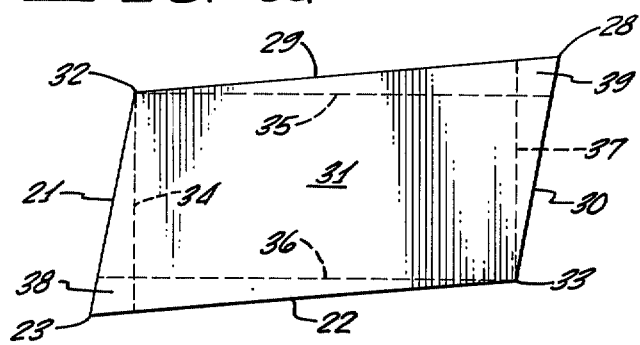
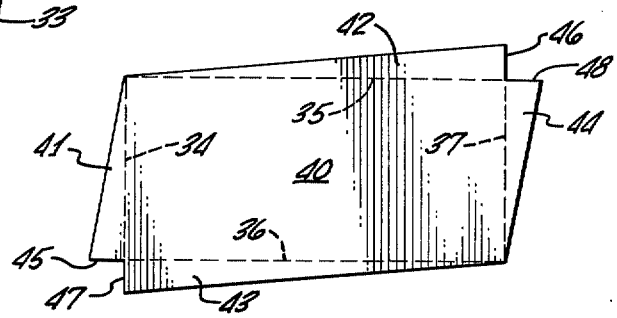
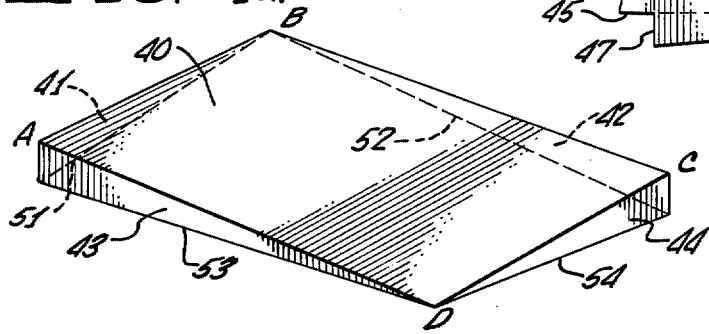
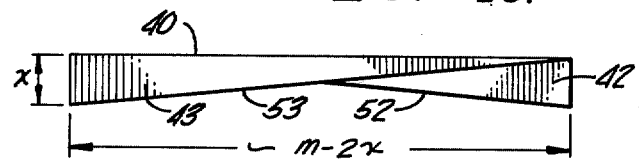
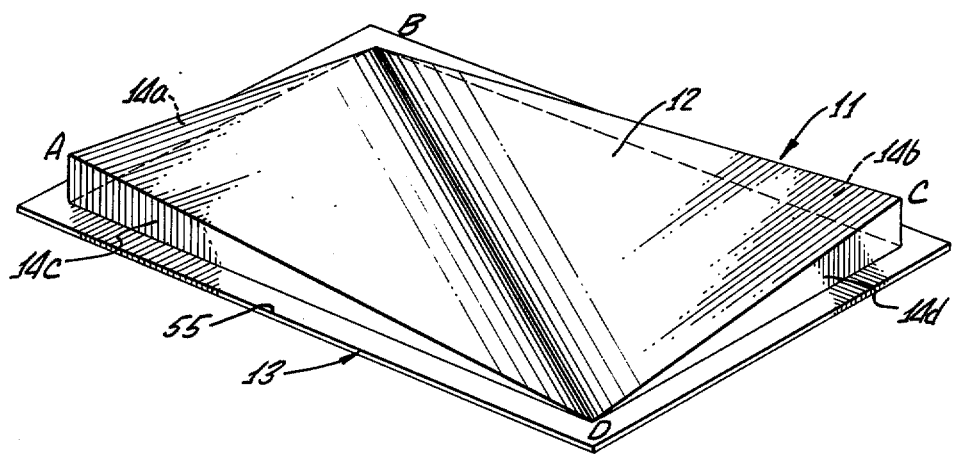

TUBELESS SOLAR COLLECTOR

BACKGROUND OF THE INVENTION

1. Field of the Invention

The present invention relates to a tubeless solar collector and, more particularly, to an inexpensive, durable, highly efficient, and easy to manufacture tubeless solar collector.

2. Description of the Prior Art

Recent large price increases and reduced availability of fossil fuel and public concern about the safety of nuclear reactors have led to a surge of interest in using the energy of the sun. Furthermore, solar energy represents the only totally non-polluting, inexhaustable energy source that can be utilized economically to supply our needs for all time.

In most practical applications utilizing solar energy, solar radiation is absorbed by a surface in a solar collector and the energy is transferred, in the form of heat, to a working fluid that is circulated through the collector. This heat is then used for water heating, building heating, operation of conversion devices such as absorption coolers, and other applications.

The solar collector is the essential item of equipment which transforms the solar radiant energy to some other useful energy form. However, the engineering design and analysis of solar collectors presents unique problems because of the intermittent and diffuse nature of the input energy.

The most economic way to collect solar energy appears to be with so-called flat-plate collectors. Flat-plate collectors can be designed for applications requiring energy delivery at moderate temperatures, up to perhaps 100° C above ambient temperature. Flat-plate collectors have the advantage of using both beam and diffuse solar radiation. They are mechanically simpler than the concentrating reflectors, orientation devices, or focusing collectors, and require little maintenance.

A typical flat-plate collector, using a liquid heat transfer fluid, includes an absorbing plate, which is generally of metal, and which has a highly absorbent coating on the outer surface thereof to maximize the absorption of solar radiation. To the other side of the absorbing plate is connected a plurality of tubes which are attached with a good thermal bond, the tubes carrying the heat transfer liquid. The absorbing plate and tubes are positioned in a surrounding frame to protect the components from atmospheric contamination. The frame typically includes insulation around the sides and back of the absorbing plate to minimize heat loss to the surroundings. Also included is one or more glass or plastic covers in front of the absorbing plate to reduce the outward heat loss from the absorber to the surroundings.

While such flat-plate collectors can furnish a significant portion of the energy needed to provide hot water for both domestic and commercial use and for the heating and cooling of buildings, several problems have prohibited the wide-scale implementation thereof. First of all, most solar collectors are complex, difficult to manufacture, and expensive. Such expense occurs as a result of the plural tubes required and the procedure required for bonding the tubes to the back of the absorber plate. Furthermore, in order to create turbulence in the fluid flowing through the tubes, to increase heat transfer from the plate to the fluid flowing therethrough, separate turbulators are added and this adds to the complexity and cost of the collector. If a tube begins to leak, the common practice is to simply seal it off and this decreases the efficiency and thermal performance of the collector. Furthermore, leaks in the tubes are commonplace so that the lifetime of common solar collectors is not great. Furthermore, most collectors are not highly efficient so that large sizes are required for the absorbing plate, presenting space problems and increasing manufacturing and installation costs.

SUMMARY OF THE INVENTION

According to the present invention, there is provided a solar collector which solves these problems in a manner unknown heretofore. The present solar collector is of the flat-plate type, but completely eliminates the need for fluid carrying tubes. Therefore, the present solar collector is easier and cheaper to manufacture and has a substantially greater lifetime than collectors used heretofore. The present solar collector inherently provides good thermal efficiency without the necessity of specially designed turbulators. The improved efficiency of the present collector will result in a direct reduction in the total collector area required, further decreasing the total cost of the system. The present collector also includes a frame and a heat exchanger suspension technique which maximizes the absorption of reflected light rays and eliminates the necessity for changing the orientation of the collector at different times of the year.

Briefly, the present solar collector comprises a heat exchanger having an upper plate, a lower plate, and four triangularly-shaped side plates defining an enclosed chamber, all plates being highly absorbent of solar radiation, the upper plate curving inwardly in a first plane so that a central portion thereof extends closely adjacent the lower plate along a hot line extending between opposite corners of the collector and in a second plane approximately perpendicular to the first plane; and means for conducting a fluid into and out of the chamber, at the remaining opposite corners thereof, on opposed sides of the hot line, so that the fluid flows through the chamber, perpendicular to and in a thin sheet past the hot line, absorbing heat from the upper surface.

The present collector also comprises a frame having an upper plate, a lower plate, and four side plates between which the heat exchanger is suspended. The lower plate of the heat exchanger is curved downwardly along the hot line to permit support thereof along the edges only. The upper plate and at least three of the side plates of the frame are highly transparent whereas the lower plate thereof is highly reflective so that angularly incident light rays are reflected by the lower plate of the frame to the lower plate of the heat exchanger to increase heat absorption.

OBJECTS

It is therefore an object of the present invention to provide a tubeless solar collector.

It is a further object of the present invention to provide a tubeless solar collector which is simple and easy to manufacture and susceptible of mass production.

It is still a further object of the present invention to provide a tubeless solar collector which is durable.

It is another object of the present invention to provide a tubeless solar collector which is inexpensive.

It is still another object of the present invention to provide a tubeless solar collector which solves the problem of turbulent flow.

Another object of the present invention is the provision of a tubeless solar collector which is highly efficient.

Still another object of the present invention is the provision of a tubeless solar collector which maximizes the absorption of angularly incident light and therefore eliminates the necessity for changing the orientation of the collector at different times of the year.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

BRIEF DESCRIPTION OF THE DRAWINGS

FIGS. 2(a) and 2(b) are sectional views taken along the lines 2—2 and 3—3, respectively, in FIG. 1;

FIGS. 3(a) – 3(e) and 4(a) – 4(b) are a series of views showing the manner in which the upper plate of the heat exchanger of FIGS. 1 and 2 may be made; and FIG. 5 is a perspective view showing the manner of connecting the upper plate of the heat exchanger to the lower plate thereof.

DESCRIPTION OF THE PREFERRED EMBODIMENT

Figure 1:
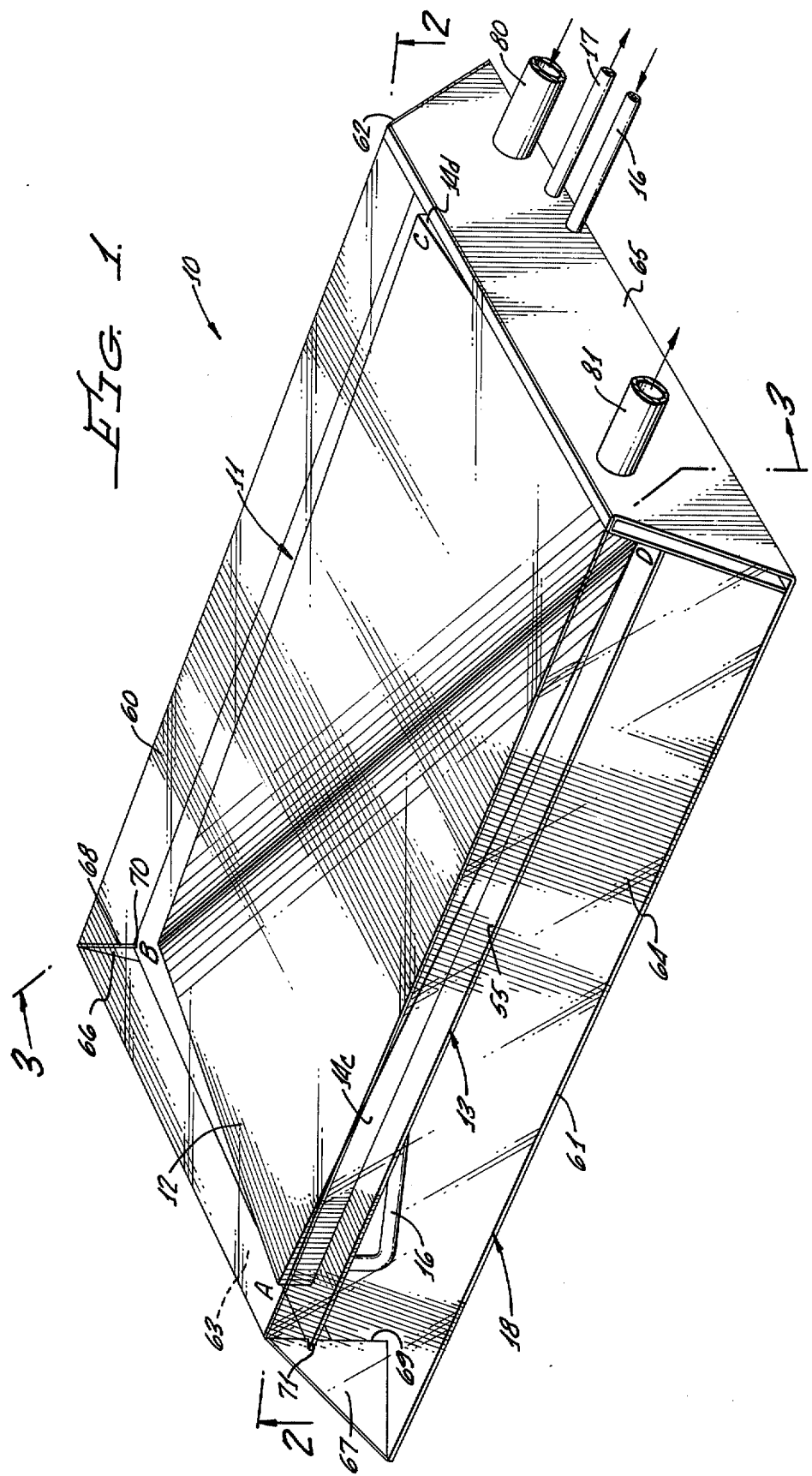
FIG. 1 is a perspective view of a solar collector constructed in accordance with the teachings of the present invention.

Referring now to the drawings and, more particularly, to FIGS. 1 and 2(a) and 2(b) thereof, the present solar collector, generally designated 10, includes a heat exchanger, generally designated 11, of the flat-plate type. That is, heat exchanger 11 includes an upper plate 12, a lower plate 13, and four triangularly-shaped side plates 14a, 14b, 14c, and 14d, which are generally of metal, and which have a highly absorbent coating on the outer surfaces thereof to maximize the absorption of solar radiation. This can be readily achieved by painting the outer surfaces of plate 12, 13 and 14a – 14d black. Plates 12, 13, and 14a – 14d define an enclosed chamber 15, through which a fluid is conducted from an inlet 16 to an outlet 17. Heat exchanger 11 i suspended within a frame, generally designated 18, which will be described more fully hereinafter.

The configuration and preferred manner of forming heat exchanger 11 may be best understood with reference to FIGS 3(a) – 3(e), 4(a), 4(b), and 5. Heat exchanger 11 starts with a planar, rectangular sheet of metal 20 having dimensions $m$ by $n$. By drawing two lines 21 and 22 from one corner 23 of sheet 20 to the opposite sides 24 and 25, respectively, thereof, lines 21 and 22 terminating at points spaced from the adjacent corners 26 and 27 by $x$ inches, by repeating this procedure from the opposite corner 28 by drawing lines 19 and 30 therefrom, and then by cutting sheet 20 along lines 21, 22, 29, and 30, a parallelogram 31 is derived, as shown in FIG. 3(c). The dimensions $m$, $n$, and $x$ will depend on the design of the system in which solar collector 10 is to be used.

Parallelogram 31 has original corners 23 and 28 and new, opposite corners 32 and 33. The next step consists of drawing two lines 34 and 35 from corner 32, at right angles to each other, and two lines 36 and 37 from corner 33, also at right angles to each other, so that lines 34 and 36 are at right angles to each other and lines 35 and 37 are at right angles to each other. Areas 38 and 39 are now removed, area 38 being that area bounded by lines 34 and 36 on two sides and being outside of the rectangle defined by line 34–37 and area 39 being that area bounded by lines 35 and 37 on two sides and being outside of the rectangle defined by lines 34–37. The result is a rectangle 40 having dimensions approximately equal to $(n - 2x)$ by $(m - 2x)$ with four triangular tabs 41–44, as shown in FIG. 3(e).

Tabs 41–44 are now bent along lines 34–37, respectively, at right angles to rectangle 40, so that side edge 45 of tab 41 contacts side edge 47 of tab 43 and side edge 46 or tab 42 contacts side edge 48 of tab 44. Edges 45 and 47 are welded together and edges 46 and 48 are welded together. The resultant shape is shown in FIGS. 4(a) and 4(b). As can be seen in FIG. 4(b), rectangle 40, which forms upper plate 12, is planar so that the lower edges 51–54 of triangular tabs 41–44, respectively, are not coplanar. Tabs 41–44 form side plates 14a – 14d, respectively.

It should also be noted, from an inspection of FIG. 4(a), that rectangle 40 has four corners A, B, C, and D. Two imaginery diagonals, diagonal AC and diagonal BD will become significant. Diagonal AC becomes the flow line of heat exchanger 11 whereas diagonal BD becomes the hot line of heat exchanger 11. Corners B and D have near zero inches height whereas corners A and C have heights of $x$ inches.

Referring now to FIG. 5, the next step is to solder, braze, weld, or in some other manner connect edges 51–54 of tabs 41–44, respectively, to another planar, rectangular sheet of metal 13 having dimensions $n$ by $m$, sheet 13 forming the lower plate of heat exchanger 11. Since plate 13 is planar, at this time, the connection of edges 51–54 of tabs 41–44 thereto requires the curving of plate 12. In fact, the connection of edge 51–54 of tabs 41–44, respectively, to plate 13 gives plate 12 a hyperbolic shape in a first plane perpendicular thereto and including corners A and C so that plate 12 extends inwardly, from corners A and C, towards plate 13, so that line BD extends closely adjacent to plate 13, virtually in contact therewith.

The resultant shape of heat exchanger 11, as shown in FIG. 5, consists of upper plate 12, lower plate 13, and sides 14a – 14d which define fluid chamber 15. Lower plate 13 adds strength to heat exchanger 11 whereas upper plate 12 is supported, not only by the four sides 14a – 14d, but also by hot line BD. When building large surfaces with tin material or with material which has a low resistance, heat exchanger 11 has a rigid, strong construction. By making plate 13 with dimensions $m$ by $n$, there is a border 55 having a width of $x$ inches which extends around heat exchanger 11. The border serves to support heat exchanger 11 in frame 18, as will be discussed more fully hereinafter. The parameter "x" is calculated based on the dimensions of collector 10 and on the function that collector 10 is going to fulfill in the system.

Returning now to FIGS. 1, 2(a), and 2(b), the next step is to install heat exchanger 11 within frame 18 of collector 10. Frame 18 includes an upper plate 60, a lower plate 61, four side plates 62–65, and a pair of supporting tab 66 and 67. All of plates 60–65 and tabs 66 and 67 are planar members. Upper plate 60 and side plates 62–64 are highly transparent, preferably being made from a plastic material with a high transmissivity so as to minimize the absorption of solar radiation before the energy has a chance to get to heat exchanger 11. On the other hand, plates 61 and 65 are made from any suitable material which is strong and light, such as wood or plastic, and the upper surface of plate 61 and the inner surface of plate 65 have highly reflective coatings thereon to maximize the reflection of solar radiation. Plate 61 is larger than plate 60 so that at least side plates 62-64 are at an angle of approximately 45° relative to lower plate 61. For reasons which will appear more fully hereinafter, plate 65 may be mounted perpendicular to plate 61.

Support tabs 66 and 67 are triangular members, tab 66 being positioned at the intersection between side plates 62 and 63 and tab 67 being located at the intersection between side plates 63 and 64. Tabs 66 and 67 have side edges 68 and 69, respectively, which face heat exchanger 11 and extend perpendicular to lower plate 61. Side edges 68 and 69 have slots 70 and 71, respectively, therein for receipt of border 55 of lower plate 13 of heat exchanger 11, at corners B and A, respectively. Side plate 65 has a slot 72 in the inner surface thereof for receipt of border 55, between corners C and D of heat exchanger 11.

It should be particularly noted that slot 72 is positioned at an angle relative to plates 60 and 61 and slots 70 and 71 are connected by an imaginery line having the same but an oppositely-oriented angle relative to plates 60 and 61 so that the insertion of heat exchanger 11 in frame 18 requires the curving of plate 13 and upper plate 12 therewith. In fact, the mounting of heat exchanger 11 in frame 18 gives plate 13 a parabolic shape in a second plane perpendicular thereto and including corners B and D (and consequently the hot line hereinbefore referred to). In other words, the entire heat exchanger 11 has corners B and D flexed downwardly so that line BD is now curved and has a generally parabolic shape. Corners B and D are lowered relative to corners A and C by at least $x$ inches, the actual distance being a function of the size of collector 10. That is, as heat exchanger 11 gets larger and larger, the corners B and D will be lowered more and more to give plate 13 the desired parabolic shape.

By giving plate 13 a curved, parabolic shape, the entire weight of heat exchanger 11 is transferred to corners B and D, so that heat exchanger 11 could literally be supported within frame 18 at corners B and D exclusively. However, according to the preferred embodiment, and as shown in FIG. 1, heat exchanger 11 is supported at corners A and B, and along a line connecting corners C and D.

The next step is to connect inlet 16 and outlet 17 to heat exchanger 11, adjacent corners A and C, to make possible to circulation of a fluid through chamber 15. While a variety of different techniques may be used for forming inlet 16 and outlet 17, tubes connected to lower plate 13, just inside of corners A and C, would be the simplest. Tubes 16 and 17 could then extend beneath lower plate 13 and through side plate 65 for connection to fluid circulation means, not shown.

As mentioned previously, upper plate 12, lower plate 13, and side plates 14a – 14b of heat exchanger 11 should be painted black with a coating having a high coefficient of absorption and a low coefficient of reflection. The inner surfaces of plates 61 and 65 should be painted with a coating having a high coefficient of reflection and a low coefficient of absorption. Heat exchanger 11 should be positioned in frame 18 with plates 60-65 completely enclosing same with an air gap of several inches between heat exchanger 11 and upper and lower plates 60 and 61, respectively, of frame 18.

In operation, fluid is conducted via inlet 16 into chamber 15. The fluid flows mostly along the flow line, diagonal AC, through an area of constantly decreasing cross-section, until reaching hot line BD. The velocity of the fluid increases, creating an area of turbulent flow and the fluid then flows perpendicular to hot line BD, in a thin sheet, under conditions of laminar flow. This reduction of the cross-section of the fluid to a thin sheet insures circulation of the fluid in chamber 15 and maximizes heat transfer from plates 12 and 13 to the entire mass of fluid in chamber 15. Therefore, no internal turbulators or any separate means for increasing heat transfer efficiency are required. As the thin sheet of liquid leaves hot line BD, which is actually a parabolically-curved line, flowing perpendicular thereto, eddy currents are created, forming turbulence in the fluid between hot line BD and outlet 17 to increase the circulation of fluid, maximizing continued heat transfer.

Because of the parabolic shape of lower plate 13, plate 13 need not be entirely supported thereunder, as is usually the case, so that heat exchanger 11 may be suspended within frame 18, as previously described. When mounting solar collector 10, it is evident that the sun's rays will be perpendicular to plate 60 for only a short period of time each day. At all other times, the sun is angularly incident on plate 60. However, with solar collector 10, the angularly incident rays can pass through angularly disposed sides 62-64 of frame 18 and be reflected by lower plate 61 to the lower surface of lower plate 13 of heat exchanger 11. This technique, therefore, maximizes the absorption of the light rays striking solar collector 10.

The preferred orientation of collector 10 is such that the sun travels across upper plate 60, from side plate 62 to side plate 64. Furthermore, side 65 of frame 18 would be mounted so as to be parallel to the sun's rays when the sun is at its highest point in the sky, such as during the summer months in the Northern hemisphere. Then, during the remainder of the year, when the sun is lower in the sky, some of the angularly incident rays will pass through the opposite side plate 63 and be reflected by lower plate 61 of frame 18 to lower plate 13 of heat exchanger 11 to increase the absorption of such angularly incident rays. In other words, the construction of frame 18 and the technique for mounting heat exchanger 11 therein eliminates the necessity for changing the orientation of collector 10 at different times of the year.

Summarizing, the hyperbolic shape of upper plate 12 of heat exchanger 11 creates the desired flow pattern through chamber 15, i.e. creates a narrow area for the fluid to flow through, and gives strength to heat exchanger 11. The curved absorbing surface also increases the absorption of rays which are reflected therefrom since some of such rays will be reflected to another portion thereof. The parabolic shape of lower plate 13 transfers the weight of heat exchanger 11 to the perimeter thereof and permits support at the edges only. This permits heat exchanger 11 to be suspended within frame 18 to permit reflection of angularly incident light from plate 61 to lower plate 13 of heat exchanger 11. This parabolic shape of lower plate 13 also has the effect of causing a flexing of heat exchanger 11, due to thermal expansion, in a direction which increases the space between plates 12 and 13, along line BD, so as to increase the rate of fluid flow therethrough. The entire construction maximizes the heat absorbing area with the minimum amount of material, making solar collector 10 suitable for economic mass production.

With collector 10, a still further advantage can be achieved. That is, frame 18 defines a closed chamber in which heat exchanger 11 is mounted. The air within such chamber obviously becomes heated due to the absorption of the sun's rays by heat exchanger 11. By providing frame 18 with an inlet 80 and an outlet 81, such as by extending pipes through side 65, at opposite diagonal corners thereof, one pipe terminating above heat exchanger 11 and the other pipe terminating below heat exchanger 11, air can be circulated through frame 18. This air will obviously be heated by heat exchanger 11 so that solar collector 10 not only functions as a fluid heater, but also as an air heater. Thus, collector 10 can also be used for household heating purposes during daylight hour in colder climates.

It can therefore be seen that according to the present invention, there is provided a solar collector which solves the problems discussed previously in a manner unknown heretofore. The largest single cost item in a solar energy system used for hot water or space heating is the collector cost. Typical collector cost are 50% to 75% or more of the total cost of a system. The improved collector efficiency achievable with the present collector will result in a direct reduction in the total collector area required, decreasing the total cost of the system. solar collector 10 is of the flat-plate type, but completely eliminates the need for fluid carrying tubes. Therefore, collector 10 is easier and cheaper to manufacture and has a substantially greater lifetime than collectors used heretofore. Collector 10 inherently provides good thermal efficiency without the necessity of specially designed turbulators. Collector 10 also includes a frame 18 and a heat exchanger suspension technique which maximizes the absorption of reflected light rays and eliminates the necessity for changing the orientation of collector 10 at different times of the year. Collector 10 not only is capable of functioning as a fluid heater, but also as an air heater.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A solar collector comprising:
    an upper plate, a lower plate, and a plurality of side plates, said plates defining an enclosed chamber, said upper plate being highly absorbent of solar radiation, said upper plate curving inwardly from said side plates so that a central portion thereof extends closely adjacent said lower plate along a continuous hot line extending across said collector to define a narrow slot of uniform height between said upper and lower plates; and
    means for conducting a fluid into and out of said chamber, on opposed sides of said hot line, said fluid flowing through said chamber, perpendicular to and in a thin sheet through said slot, and absorbing heat from said upper plate.

2. A solar collector according to claim 1 wherein said chamber provides a single, continuous channel from said inlet to said outlet.

3. A solar collector according to claim 1 wherein said hot line extends entirely across said collector.

4. A solar collector according to claim 1 wherein said upper plate is rectangular and said hot line extends from one corner thereof to an opposite corner thereof.

5. A solar collector according to claim 4 wherein said fluid conducting means are positioned adjacent the remaining opposite corners of said collector.

6. A solar collector according to claim 1 wherein said solar collector has four side plates, wherein said hot line extends between first, opposite corners of said collector, and wherein said fluid conducting means conducts fluid into and out of said chamber at second opposite corners thereof.

7. A solar collector comprising:
    an upper plate, a lower plate, and a plurality of side plates, said plates defining an enclosed chamber, said upper plate being highly absorbent of solar radiation, said upper plate curving inwardly from said side plates so that a central portion thereof extends closely adjacent said lower plate along a hot line extending across said collector, said upper plate being rectangular and said hot line extending from one corner thereof to an opposite corner thereof, said upper plate being hyperbolic in a plane perpendicular to said upper plate and including the remaining corners thereof, said lower plate being curved outwardly and being parabolic in a plane perpendicular to said lower plate and including said hot line; and means for conducting a fluid into and out of said chamber, on opposed sides of said hot line, said fluid flowing through said chamber, perpendicular to and in a thin sheet past said hot line, and absorbing heat from said upper plate.

8. A solar collector comprising:
    an upper plate, a lower plate, and four side plates, said plates defining an enclosed chamber, said upper plate being highly absorbent of solar radiation, said upper plate curving inwardly from said side plates so that a central portion thereof extends closely adjacent said lower plate along a hot line extending between first, opposite corners of said collector, said four side plates being triangular in shape, one side edge of each side plate being in contact with said lower plate, another side edge of each side plate being in contact with another one of said other side edges, and the remaining side edge of each side plate being in contact with said upper plate; and
    means for conducting a fluid into and out of said chamber, at second opposite corners thereof, on opposed sides of said hot line, said fluid flowing through said chamber, perpendicular to and in a thin sheet past said hot line, and absorbing heat from said upper plate.

9. A solar collector comprising:
    an upper plate, a lower plate, and four side plates, said plates defining an enclosed chamber, said upper plate being highly absorbent of solar radiation, said upper plate curving inwardly from said side plates so that a central portion thereof extends closely adjacent said lower plate along a hot line extending across said collector, between first, opposite corners thereof; and
    means for conducting a fluid into and out of said chamber, at second opposite corners thereof, on opposed sides of said hot line, said fluid flowing through said chamber, perpendicular to and in a thin sheet past said hot line, and absorbing heat from said upper plate, wherein said lower plate is curved outwardly along said hot line to permit support thereof along the edges only.

10. A solar collector comprising:
an upper plate, a lower plate, and a plurality of side plates, said plates defining an enclosed chamber, said upper plate being highly absorbent of solar radiation, said upper plate curving inwardly from said side plates so that a central portion thereof extends closely adjacent said lower plate, along a hot line extending across said collector; and
means for conducting a fluid into and out of said chamber, on opposed sides of said hot line, said fluid flowing through said chamber, perpendicular to and in a thin sheet past said hot line, and absorbing heat from said upper plate, wherein said lower plate is curved outwardly along said hot line to permit support thereof along the edges only.

11. A solar collector comprising a heat exchanger and a frame therefor, said heat exchanger comprising:
an upper plate, a lower plate, and a plurality of side plates, said plates defining a first enclosed chamber, all of said plates being highly absorbent of solar radiation, said upper plate curving inwardly from said side plates so that a central portion thereof extends closely adjacent said lower plate, along a hot line extending across said collector, said lower plate curving outwardly in a plane perpendicular thereto and including said hot line; and
means for conducting a fluid into and out of said first chamber, on opposed sides of said hot line, said fluid flowing through said first chamber, perpendicular to and in a thin sheet past said hot line, and absorbing heat from said plates; said frame comprising:
an upper plate, a lower plate, and a plurality of side plates, said plates defining a second enclosed chamber in which said heat exchanger is suspended, spaced from said upper and lower plates thereof, said upper plate and at least some of said side plates of said frame being highly transparent to solar radiation, the inner surface of said lower plate of said frame being highly reflective of solar radiation so that angularly incident light rays are reflected by said lower plate of said frame to said lower plate of said heat exchanger.

12. A solar collector according to claim 11 wherein said upper plate of said heat exchanger is rectangular and said hot line extends between first opposite corners thereof.

13. A solar collector according to claim 12 wherein said upper plate of said heat exchanger has a hyperbolic cross-section in a plane perpendicular thereto and including the remaining opposite corners thereof.

14. A solar collector according to claim 13 wherein said lower plate of said heat exchanger has a parabolic cross-section in a plane perpendicular thereto and including said first opposite corners thereof.

15. A solar collector according to claim 12 wherein said upper and lower plates of said frame are rectangular and wherein said lower plate of said frame is larger than said upper plate thereof so that at least two of said side plates of said frame are angularly disposed relative to said upper and lower plates thereof.

16. A solar collector according to claim 15 wherein three of said side plates of said frame are angularly disposed relative to said upper and lower plates thereof.

17. A solar collector according to claim 16 wherein said three side plates of said frame are highly transparent to solar radiation.

18. A solar collector according to claim 17 wherein the fourth side plate of said frame is positioned perpendicular to said upper and lower plates thereof and the inner surface thereof is highly reflective of solar radiation.

19. A solar collector according to claim 11 further comprising:
means for conducting air into and out of said frame, said air flowing through said second chamber, around said heat exchanger, for heating said air.

20. A solar collector according to claim 11 wherein said frame supports said heat exchanger only around the perimeter thereof.

* * * * *